United States Patent
Arvela

(10) Patent No.: US 12,039,272 B2
(45) Date of Patent: Jul. 16, 2024

(54) METHOD OF TRAINING A NATURAL LANGUAGE SEARCH SYSTEM, SEARCH SYSTEM AND CORRESPONDING USE

(71) Applicant: IPRally Technologies Oy, Helsinki (FI)

(72) Inventor: Sakari Arvela, Helsinki (FI)

(73) Assignee: IPRally Technologies Oy, Helsinki (FI)

( * ) Notice: Subject to any disclaimer, the term of this patent is extended or adjusted under 35 U.S.C. 154(b) by 547 days.

(21) Appl. No.: 17/284,799

(22) PCT Filed: Oct. 13, 2019

(86) PCT No.: PCT/FI2019/050733
§ 371 (c)(1),
(2) Date: Apr. 13, 2021

(87) PCT Pub. No.: WO2020/074788
PCT Pub. Date: Apr. 16, 2020

(65) Prior Publication Data
US 2021/0397790 A1    Dec. 23, 2021

(30) Foreign Application Priority Data
Oct. 13, 2018   (FI) .................................... 20185865

(51) Int. Cl.
*G06F 16/245*   (2019.01)
*G06F 16/31*    (2019.01)
(Continued)

(52) U.S. Cl.
CPC .......... *G06F 40/284* (2020.01); *G06F 16/322* (2019.01); *G06F 16/355* (2019.01);
(Continued)

(58) Field of Classification Search
CPC ................................. G06F 7/00; G06F 17/30
See application file for complete search history.

(56) References Cited

U.S. PATENT DOCUMENTS 10,073,890 B1 * 9/2018 Khamis ................. G06F 16/285
10,546,273 B2 * 1/2020 Lundberg ............... G06Q 10/10
(Continued)

FOREIGN PATENT DOCUMENTS

CN    108717601 A  * 10/2018 ........... G06K 9/6221
CN    110019806 B  *  8/2021 ........... G06F 17/277
(Continued)

OTHER PUBLICATIONS

Abood et al: Automated patent landscaping. Artificial Intelligence and Law, Springer, Mar. 28, 2018, vol. 26, No. 2, pp. 103-125.
(Continued)

*Primary Examiner* — Shreyans A Patel
(74) *Attorney, Agent, or Firm* — Laine IP Oy

(57) ABSTRACT

The invention provides a method and system for training a machine learning-based patent search or novelty evaluation system. The method comprises providing a plurality of patent documents each having a computer-identifiable claim block and specification block, the specification block including at least part of the description of the patent document. The method also comprises providing a machine learning model and training the machine learning model using a training data set comprising data from said patent documents for forming a trained machine learning model. According to the invention, the training comprises using pairs of claim blocks and specification blocks originating from the same patent document as training cases of said training data set.

17 Claims, 8 Drawing Sheets

(51) Int. Cl.
  *G06F 16/35* (2019.01)
  *G06F 40/211* (2020.01)
  *G06F 40/284* (2020.01)
  *G06N 3/08* (2023.01)
  *G06N 20/00* (2019.01)
  *G06Q 50/18* (2012.01)

(52) U.S. Cl.
  CPC ............ *G06F 40/211* (2020.01); *G06N 3/08* (2013.01); *G06N 20/00* (2019.01); *G06Q 50/184* (2013.01); *G06F 2216/11* (2013.01)

(56) References Cited

U.S. PATENT DOCUMENTS

| | | | |
|---|---|---|---|
| 10,810,193 B1* | 10/2020 | Subramanya | G06F 16/245 |
| 2003/0046307 A1 | 3/2003 | Rivette et al. | |
| 2004/0181427 A1 | 9/2004 | Stobbs et al. | |
| 2011/0191310 A1 | 8/2011 | Liao et al. | |
| 2013/0013291 A1 | 1/2013 | Bullock et al. | |
| 2013/0086045 A1* | 4/2013 | Lundberg | G06F 16/35 707/E17.014 |
| 2016/0012122 A1 | 1/2016 | Franceschini et al. | |
| 2016/0048773 A1 | 2/2016 | Kapur et al. | |
| 2016/0188564 A1 | 6/2016 | Lobez Comeras et al. | |
| 2017/0075877 A1 | 3/2017 | Lepeltier | |
| 2017/0132288 A1* | 5/2017 | Ho | G06F 40/30 |
| 2018/0018564 A1 | 1/2018 | Erenrich et al. | |
| 2018/0300323 A1* | 10/2018 | Lee | G06F 16/353 |
| 2018/0314939 A1* | 11/2018 | Skiles | G06F 3/04842 |
| 2018/0341630 A1 | 11/2018 | Devries | |
| 2020/0073879 A1* | 3/2020 | Grabau | G06F 16/93 |

FOREIGN PATENT DOCUMENTS

| | | | |
|---|---|---|---|
| WO | WO2014127500 A1 | 8/2014 | |
| WO | WO2018125585 A1 | 7/2018 | |

OTHER PUBLICATIONS

Adebayo et al: Textual Inference with Tree-Structured LSTM. Communications in Computer and Information Science, Jan. 1, 2017, vol. 765, pp. 17-31.

Anonymous: Stanford Parser. Sep. 12, 2016.

Arvela: Patent Automation—It's About Time. Special Stages of IPRally, Apr. 18, 2018.

Carvalho et al: Extracting Semantic Information from Patent Claims Using Phrasal Structure Annotations. 2014 Brazilian Conference on Intelligent Systems, IEEE, Oct. 18, 2014, pp. 31-36.

Fadaee et al: Data Augmentation for Low-Resource Neural Machine Translation. Proceedings of the 55th Annual Meeting of the Association for Computational Linguistics, Jul. 20-Aug. 4, 2017, pp. 567-573.

Lin et al: The Study of Patent Prior Art Retrieval Using Claim Structure and Link Analysis. PACIS 2010 Proceedings. 2010, pp. 1953-1962.

Miwa et al: End-to-End Relation Extraction using LSTMs on Sequences and Tree Structures. Proceedings of the 54th Annual Meeting of the Association for Computational Linguistics, 2016, Berlin, Germany, pp. 1105-1116.

Papadaki: Data Augmentation Techniques for Legal Text Analytics. Thesis Submitted to Athens University of Economics and Business, Oct. 2017, pp. 1-33.

Pattabhi et al: Patent Document Summarization Using Conceptual Graphs. International Journal on Natural Language Computing, Jun. 30, 2017, vol. 6, No. 3, pp. 15-32.

Ruan et al: A Sequential Neural Encoder with Latent Structured Description for Modeling Sentences. Journal of Latex Class Files, Aug. 2015, vol. 14, No. 8, pp. 1-13.

Schuster et al: Enhanced English Universal Dependencies: An Improved Representation for Natural Language Understanding Tasks. Mar. 11, 2016.

Tai et al: Improved Semantic Representations From Tree-Structured Long Short-Term Memory Networks 11. Proceedings of the 53rd Annual Meeting of the Association for Computational Linguistics and the 7th International Joint Conference on Natural Language Processing (vol. 1: Long Papers), May 30, 2015, pp. 1556-1566.

The Stanford Natural Language Processing Group: The Stanford Parser: A statistical parser. Aug. 19, 2018.

Yang et al: Extract conceptual graphs from plain texts in patent claims. Engineering Applications of Artifical Intelligence Elsevier, Jun. 2012, vol. 25, No. 4, pp. 874-887.

Cano et al: A Method for Integrating Expert Knowledge When Learning Bayesian Networks From Data. IEEE Transactions on Systems, Man, and Cybernetics—Part B: Cybernetics, Oct. 2011, vol. 41, No. 5., pp. 1382-1394.

Mills et al: Graph-Based Methods for Natural Language Processing and Understanding—A Survey and Analysis. IEEE Transactions on Systems, Man, and Cybernetics: Systems, Jan. 2014, vol. 44, No. 1, pp. 59-71.

\* cited by examiner

METHOD OF TRAINING A NATURAL LANGUAGE SEARCH SYSTEM, SEARCH SYSTEM AND CORRESPONDING USE

FIELD OF THE INVENTION

The invention relates to natural language processing. In particular, the invention relates to machine learning based, such as neural network based, systems and methods for searching, comparing or analyzing documents containing natural language. The documents may be technical documents or scientific documents. In particular, the documents can be patent documents.

BACKGROUND OF THE INVENTION

Comparison of written technical concepts is needed in many areas of business, industry, economy and culture. A concrete example is the examination of patent applications, in which one aim is to determine if a technical concept defined in a claim of a patent application semantically covers another technical concept defined in another document.

Currently, there are an increasing number of search tools available for finding individual documents, but analysis and comparison of concepts disclosed by the documents is still largely manual work, involving human deduction on the meaning of words, sentences and larger entities of language.

Scientific study around natural language processing has produced tools for parsing language automatically by computers. These tools can be used e.g. to tokenize text, part-of-speech tagging, entity recognition and identifying dependencies between words or entities.

Scientific work has also been done to analyze patents automatically, for example for text summarization and technology trend analysis purposes by extracting key concepts from the documents.

Recently, word embedding using multidimensional word vectors have become important tools for mapping the meaning of words into numeric computer processable form. This approach can be used by neural networks, such as recurrent neural network, for providing computers a deeper understanding of the content of documents. These approaches have proved powerful e.g. in machine translation applications.

Patent searches are traditionally made using keyword searches, which involve defining the right keywords and their synonyms, inflection forms etc, and creation of a boolean search strategy. This is time-consuming and requires expertise. Recently, semantic searches have also been developed, which are fuzzier and may involve use of artificial intelligence technologies. They help to quickly find a large number of documents that somehow relate to the concepts discussed in another document. They are, however, relatively limited in e.g. patent novelty searches, since their ability evaluate novelty in practice, i.e. to find documents disclosing specific contents falling under a generic concept defined in a patent claim, is limited.

In summary, there are techniques available that are well suitable for general searches, and e.g. extracting core concepts from texts and summarization of texts. They are, however, not well suited for making detailed comparisons between concepts disclosed in different documents in large data masses which is crucial e.g. for patent novelty search purposes or other technical comparison purposes.

There is a need for improved techniques for analysis and comparison of texts in particular for achieving more efficient search and novelty evaluation tools.

SUMMARY OF THE INVENTION

It is an aim of the invention to solve at least some of the abovementioned problems and to provide a novel system and method for increasing the accuracy of technical searches. A specific aim is to provide a solution that helps automated systems to better evaluate the novelty of concepts disclosed in document with respect to each other and to take their technical relationships better into account.

A particular aim is to provide an improved machine learning based search system and a method of training such system.

Specific aims include providing a patent search or novelty evaluation system with improved accuracy and providing new uses for publicly available patent data.

According to one aspect, the invention provides a method of training a machine learning-based patent search or novelty evaluation system, the method comprising providing a plurality of patent documents each having a computer-identifiable claim block and specification block, the specification block including at least part of the description of the patent document. The method also comprises providing a machine learning model and training the machine learning model using a training data set comprising data from said patent documents for forming a trained machine learning model. According to the invention, the training comprises using pairs of claim blocks and specification blocks originating from a single, i.e. the same, patent document as training cases of said training data set.

The machine learning model is preferably capable of embedding the claim and specification blocks into vectors. The abovementioned training cases, i.e. training samples, are positive training samples, whereby the learning target of the model may be to minimize vector angles between the claim and specification blocks. Other positive training samples may be claim and specification blocks that do not originate from the same document but are associated with each other via a database reference. Another learning target may be to maximize vector angles, or to provide non-zero vector angles, between claim and specification blocks originating from at least some different documents that are not associated with each other this way, thereby forming negative training samples.

According to one aspect, there is provided a machine learning-based patent search or novelty evaluation system, comprising a machine learning training sub-system adapted to read patent claim blocks and specification blocks of patent documents and to use said as training data, and a machine learning search engine using the trained machine learning model for finding a subset of patent documents among a larger set of patent documents. In the invention, the machine learning training sub-system is configured to use pairs of claim blocks and specification blocks originating from the same patent document as training cases of said training data set.

In one aspect, there is provided a natural language search system comprising a digital data storage means for storing a plurality of blocks of natural language and data graphs corresponding to said blocks. There are also provided first data processing means adapted to convert said blocks to said graphs, which are stored in said storage means. The graphs contain a plurality of nodes, preferably successive nodes, each containing as node value, or part thereof, a natural language unit extracted from said blocks. There are also provided second data processing means for executing a machine learning algorithm capable of travelling said graphs and reading the node values for forming a trained machine learning model based on nodal structures of the graphs and node values of the graphs. A third data processing means adapted to read a fresh graph or fresh block of natural language which is converted to a fresh graph, and to utilize said machine learning model for determining a subset of said blocks of natural language based on the fresh graph. The first and second data processing means are part of a machine learning trainer sub-system as described above. The third data processing means is a machine learning search engine as described above.

The graphs can in particular be tree-form recursive graphs having a meronym relation between node values of successive nodes.

The method and system are preferably neural network-based, whereby the machine learning model is a neural network model.

More specifically, the invention is characterized by what is stated in the independent claims.

The invention offers significant benefits. While patent novelty search data and citation data provided by patent authorities and patent applicants can be used to train neural networks, their drawback is that the quality of data varies. In particular, only some of the novelty bars raised by patent authorities are actually novelty bars. Still, all citations made by patent examiners end up to public records and patent databases, from which it is impossible to tell without manual evaluation which ones are truly relevant. This decreases the reliability of the publicly available training data. The present invention allows for at least one truly relevant training case for each claim, and in particular for the independent claim or claims. Therefore, neural networks can be trained more accurately to find relevant prior art documents.

The presently disclosed same-document training cases can be the only positive (relevant prior art indicating) training cases used, or novelty search data and/or citation data can be used too to form further training cases.

The present approach is also compatible with advanced training schemes, such as data augmentation, as will be discussed later in detail. The combination of these approaches provides particularly good training results.

All this helps to make more targeted searches and more accurate automated novelty evaluations with less manual work needed.

Tree-form graphs having meronym edges are particularly beneficial as they are fast and safe to modify still preserving the coherent technical and sematic logic inside the graphs.

The dependent claims are directed to selected embodiments of the invention.

Next, selected embodiments of the invention and advantages thereof are discussed in more details with reference to the attached drawings.

DETAILED DESCRIPTION OF EMBODIMENTS

Definitions

Figure 1A:
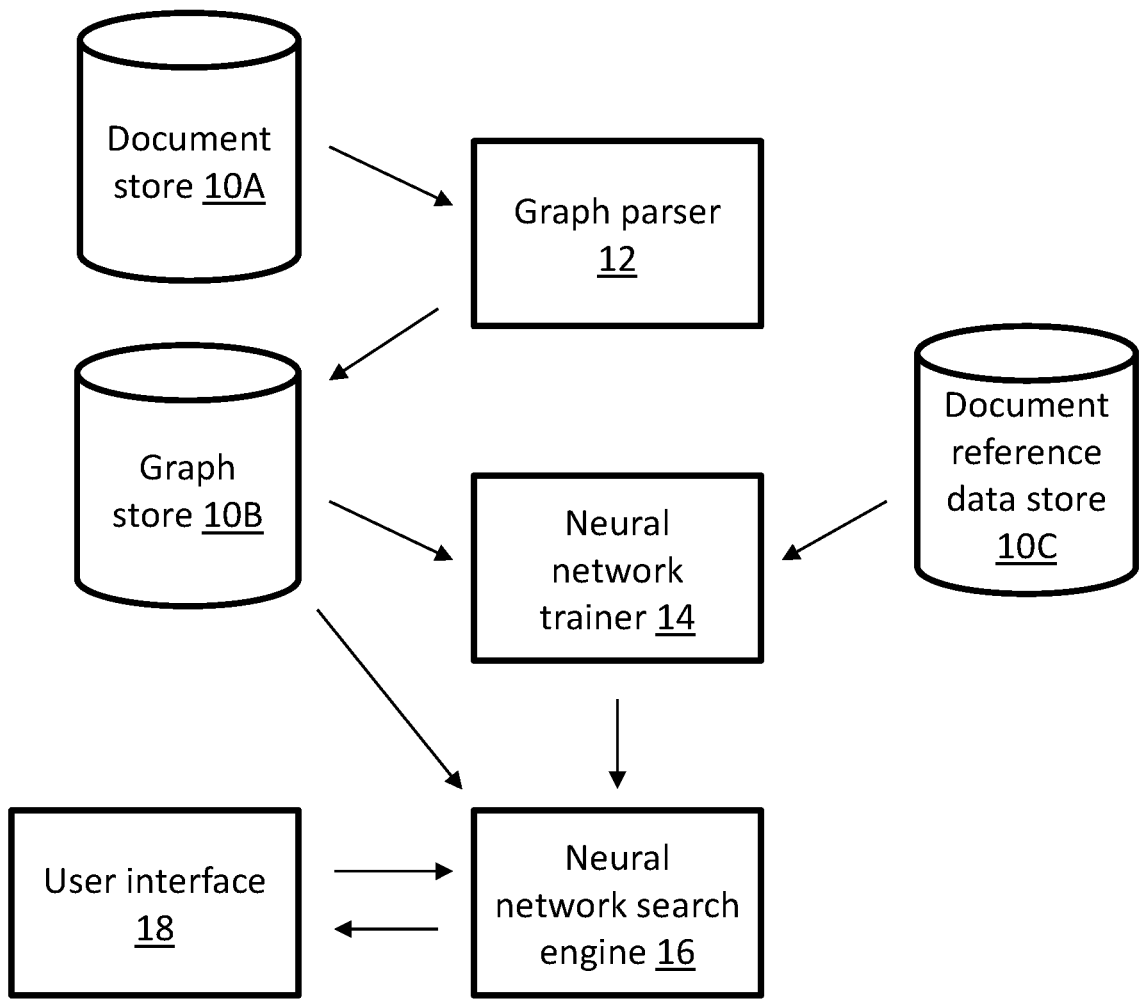
FIG. 1A shows a block diagram of an exemplary search system in a general level.

"Natural language unit" herein means a chunk of text or, after embedding, vector representation of a chunk of text. The chunk can be a single word or a multi-word sub-concept appearing once or more in the original text, stored in computer-readable form. The natural language units may be presented as a set of character values (known usually as "strings" in computer science) or numerically as multi-dimensional vector values, or references to such values.

"Block of natural language" refers to a data instance containing a linguistically meaningful combination of natural language units, for example one or more complete or incomplete sentences of a language, such as English. The block of natural language can be expressed, for example as a single string and stored in a file in a file system and/or displayed to the user via the user interface.

"Document" refers to a machine-readable entity containing natural language content and being associated with a machine-readable document identifier, which is unique with respect to other documents within the system.

"Patent document" refers to the natural language content of a patent application or granted patent. Patent documents are associated in the present system with a publication number that is assigned by a recognized patent authority, such as the EPO, WIPO or USPTO, or another national or regional patent office of another country or region, and/or another machine-readable unique document identifier. The term "claim" refers to the essential content of a claim, in particular an independent claim, of a patent document. The term "specification" refers to content of patent document covering at least a portion of the description of the patent document. A specification can cover also other parts of the patent document, such as the abstract or the claims. Claims and specifications are examples of blocks of natural language.

"Claim" is herein defined as a block of natural language which would be considered as a claim by the European Patent Office on the effective date of this patent application. In particular, a "claim" is a computer-identifiable block of a natural language document identified with a machine-readable integer number therein, for example in string format in front of the block and/or as (part of) a related information in a markup file format, such as xml or html format.

"Specification" is herein defined as a computer-identifiable block of natural language, computer-identifiable within a patent document also containing at least one claim, and containing at least one other portion of the than document than the claim. Also a "specification" can be identifiable by related information in a markup file format, such as xml or html format.

"Edge relation" herein may be in particular a technical relation extracted from a block and/or a semantic relation derived from using semantics of the natural language units concerned. In particular, the edge relation can be
- a meronym relation (also: meronym/holonym relation); meronym: X is part of Y; holonym: Y has X as part of itself; for example: "wheel" is a meronym of "car",
- a hyponym relation (also: hyponym/hypernym relation); hyponym: X is a subordinate of Y; hypernym: X is a superordinate of Y; example: "electric car" is a hyponym of "car", or
- a synonym relation: X is the same as Y.

In some embodiments, the edge relations are defined between successively nested nodes of a recursive graph, each node containing a natural language unit as node value.

Further possible technical relations include thematic relations, referring to the role that a sub-concept of a text plays with respect to one or more other sub-concepts, other than the abovementioned relations. At least some thematic relations can be defined between successively nested units. In one example, the thematic relation of a parent unit is defined in the child unit. An example of thematic relations is the role class "function". For example, the function of "handle" can be "to allow manipulation of an object". Such thematic relation can be stored as a child unit of the "handle" unit, the "function" role being associated with the child unit. A thematic relation may also be a general-purpose relation which has no predefined class (or has a general class such as "relation"), but the user may define the relation freely. For example, a general-purpose relation between a handle and a cup can be "[handle] is attached to [cup] with adhesive". Such thematic relation can be stored as a child unit of either the "handle" unit or the "cup" unit, or both, preferably with inter-reference to each other.

A relation unit is considered to define a relation in a particular relation class or subclass, if it is linked to computer-executable code that produces a block of natural language including that a relation in that class or subclass when run by the data processor.

"Graph" or "data graph" refers to a data instance that follows a generally non-linear recursive and/or network data schema. The present system is capable of simultaneously containing several different graphs that follow the same data schema and whose data originates from and/or relates to different sources. The graph can in practice be stored in any suitable text or binary format, that allows storage of data items recursively and/or as a network. The graph is in particular a semantic and/or technical graph (describing semantic and/or technical relations between the node values), as opposed to a syntactic graph (which describing only linguistic relations between node values). The graph can be a tree-form graph. Forest form graphs including a plurality of trees are considered tree-form graphs herein. In particular, the graphs can be technical tree-form graphs.

"Data schema" refers to the rules according to which data, in particular natural language units and data associated therewith, such as information of the technical relation between the units, are organized.

"Nesting" of natural language units refers to the ability of the units to have one or more children and one or more parents, as determined by the data schema. In one example, the units can have one or more children and only a single parent. A root unit does not have a parent and leaf units do not have children. Sibling units have the same parent. "Successive nesting" refers to nesting between a parent unit and direct child unit thereof.

"Recursive" nesting or data schema refers to nesting or data schema allowing for natural language unit containing data items to be nested.

"(Natural language) token" refers to a word or word chunk in a larger block of natural language. A token may contain also metadata relating to the word or word chunk, such as the part-of-speech (POS) label or syntactic dependency tag. A "set" of natural language tokens refers in particular to tokens that can be grouped based on their text value, POS label or dependency tag, or any combination of these according to predetermined rules or fuzzy logic.

The terms "data storage means", "processing means" and "user interface means" refer primarily to software means, i.e. computer-executable code (instructions), that, can be stored on a non-transitory computer-readable medium and are adapted to carry out the specified functions, that is, storing of digital data, allowing user to interact with the data, and processing the data, respectively, when executed by a processor. All of these components of the system can be carried in a software run by either a local computer or a web server, through a locally installed web browser, for example, supported by suitable hardware for running the software components. The method described herein is a computer-implemented method.

Description of Selected Embodiments

A natural language search system is described below, that comprises digital data storage means for storing a plurality of blocks of natural language and data graphs corresponding to the blocks. The storage means may comprise one or more local or cloud data stores. The stores can be file based or query language based.

The first data processing means is a converter unit adapted to convert the blocks to the graphs. Each graph contains a plurality of nodes each containing as node value a natural language unit extracted from the blocks. Edges are defined between pairs of nodes, defining the technical relation between nodes. For example, the edges, or some of them, may define a meronym relation between two nodes.

In some embodiments, the number of at least some nodes containing particular natural language unit values in the graph is smaller than the number of occurrences of the particular natural language unit in the corresponding block of natural language. That is, the graph is a condensed representation of the original text, achievable for example using a token identification and matching method described later. The essential technical (and optionally semantic) content of the text can still be maintained in the graph representation by allowing a plurality of child nodes for each node. A condensed graph is also efficient to process by graph-based neural network algorithms, whereby they are able to learn the essential content of the text better and faster than from direct text representations. This approach has proven particularly powerful in comparison of technical texts, and in particular in searching patent specifications based on claims and automatic evaluation of the novelty of claims.

In some embodiments, the number of all nodes containing a particular natural language unit is one. That is, there are no duplicate nodes. While this may result in simplification of the original content of the text, at least when using tree-form graphs, it results in very efficiently processable and still relatively expressive graphs suitable for patent searches and novelty evaluations.

In some embodiments, the graphs are such condensed graphs at least for nouns and noun chunks found in the original text. In particular, the graphs can be condensed graphs for noun-valued nodes arranged according to their meronym relations. In average patent documents, many noun terms occur tens or even hundreds of times throughout the text.

By means of the present scheme, the contents of such documents can be compressed to a fraction of original space while making them more viable for machine learning.

In some embodiments, a plurality of terms occurring many times in at least one original block of natural language occur exactly once in the corresponding graph.

Condensed graph representation is also beneficial as synonyms and coreference (expressions meaning the same thing in a particular context) can be taken into account when building the graph. This results in even more condensed graphs. In some embodiments, a plurality of terms occurring in at least one original block of natural language in at least two different written forms occur exactly once in the corresponding graph.

The second data processing means is a neural network trainer for executing a neural network algorithm capable of travelling through the graph structure iteratively and learning both from the internal structure of the graphs and its node values, as defined by a loss function which defines a learning target together with the training data cases. The trainer typically receives as training data combinations of the graphs or augmented graphs derived therefrom, as specified by the training algorithm. The trainer outputs a trained neural network model.

This kind of a supervised machine learning method employing graph-form data as described herein has been found to be exceptionally powerful in finding technically relevant documents among patent documents and scientific documents.

In some embodiments, the storage means is further configured to store reference data linking at least some of the blocks to each other. The reference data is used by the trainer to derive the training data, i.e. to define the combinations of graphs that are used in the training either as positive or negative training cases, i.e. training samples. The learning target of the trainer is dependent on this information.

The third data processing means is a search engine which is adapted to read a fresh graph or fresh block of natural language, typically through a user interface or network interface. If needed, the block is converted to a graph in the converter unit. The search engine uses the trained neural network model for determining a subset of blocks of natural language (or graphs derived therefrom) based on the fresh graph.

FIG. 1A shows an embodiment of the present system suitable in particular for searching technical documents, such as patent documents, or scientific documents. The system comprises a document store 10A, which contains a plurality of natural language documents. A graph parser 12 which is adapted to read documents from the document store 10A and to convert them into graph format, which is discussed later in more detail. The converted graphs are stored in a graph store 10B.

The system comprises a neural network trainer unit 14, which receives as training data a set of parsed graphs from the graph store, as well as some information about their relations to each other. In this case, there is provided document reference data store 100, including e.g. citation data and/or novelty search result regarding the documents. The trainer unit 14 run a graph-based neural network algorithm that produces a neural network model for a neural network-based search engine 16. The engine 16 uses the graphs from the graph store 10B as a target search set and user data, typically a text or graph, obtained from a user interface 18 as a reference.

The search engine 16 may be e.g. a graph-to-vector search engine trained to find vectors corresponding to graphs of the graph store 10B closest to a vector formed from the user data. The search engine 16 may also be a classifier search engine, such as a binary classifier search engine, which compares pairwise the user graph, or vector derived therefrom, to graphs obtained from the graph store 10B, or vectors derived therefrom.

Figure 1B:
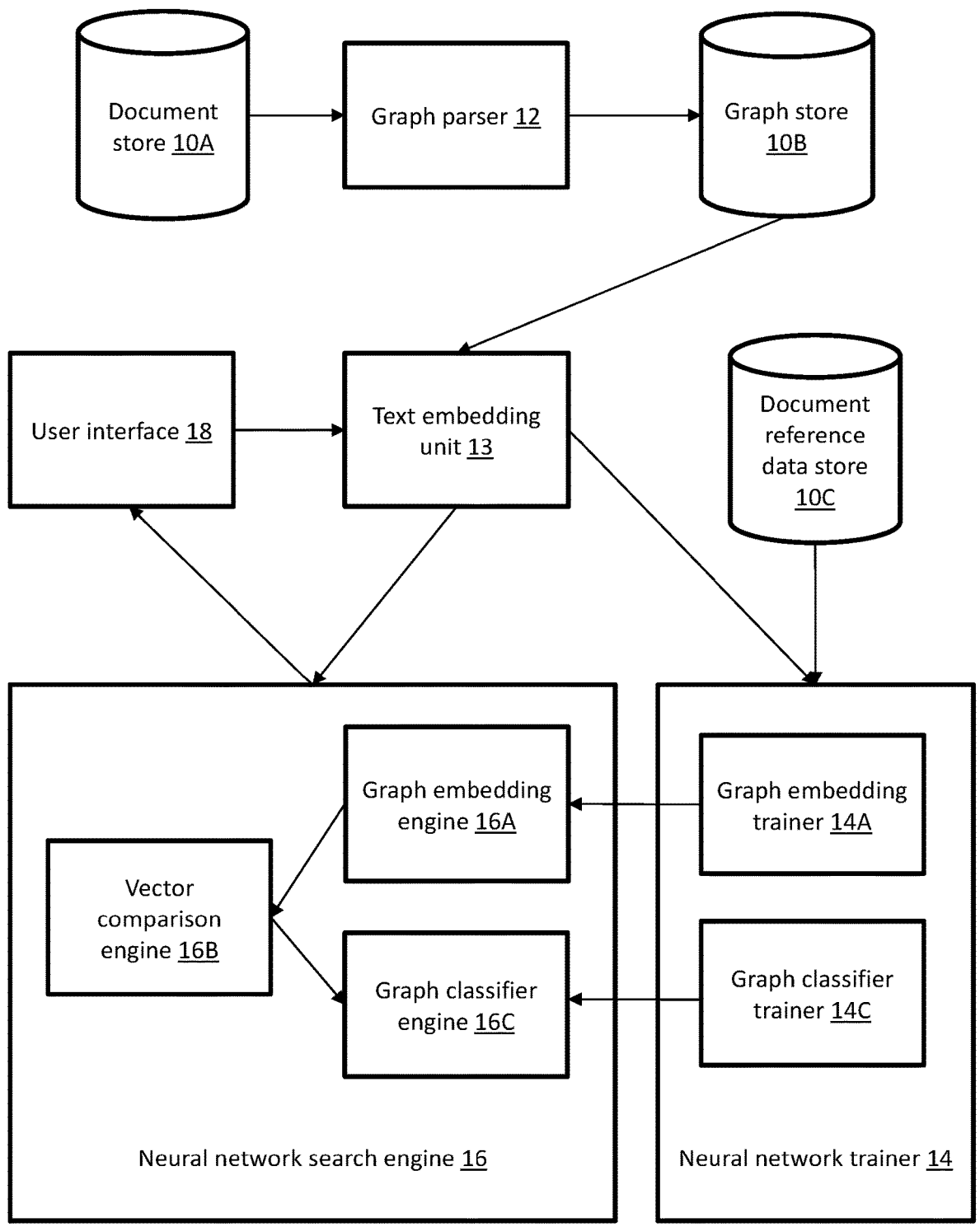
FIG. 1B shows a block diagram of a more detail embodiment of the search system, including a pipeline of neural network-based search engines and their trainers.

FIG. 1B shows an embodiment of the system, further comprising a text embedding unit 13, which converts the natural language units of the graphs into multidimensional vector format. This is done for the converted graphs and from the graph store 10B and graphs entered through the user interface 18. Typically, the vectors have at least 100 dimensions, such as 300 dimensions or more.

In one embodiment also shown in FIG. 1B, the neural network search engine 16 is divided into two parts forming a pipeline. The engine 16 comprises a graph embedding engine that converts graphs into multidimensional vector format using a model trained by a graph embedding trainer 14A of the neural network trainer 14 using reference data from the document reference data store 100, for example. A user graph is compared with graphs pre-produced by the graph embedding engine 16A in a vector comparison engine 16B. As a result a narrowed-down subset of graphs closest to the user graph is found. The subset of graphs is further compared by a graph classifier engine 16C with the user graph in order to further narrow down the set of relevant graphs. The graph classifier engine 16C is trained by a graph classifier trainer 14C using data from the document reference data store 100, for example, as the training data. This embodiment is beneficial because vector comparison of pre-formed vectors by the vector comparison engine 16B is very fast, whereas the graph classification engine has access to detailed data content and structure of the graphs and can make accurate comparison of the graphs to find out differences between them. The graph embedding engine 16A and vector comparison engine 16B serve an efficient pre-filter for the graph classifier engine 16C, reducing the amount of data that needs to be processed by the graph classifier engine 16C.

The graph embedding engine can convert the graphs into vectors having at least 100 dimensions, preferably 200 dimensions or more and even 300 dimensions or more.

The neural network trainer 14 is split into two parts, a graph embedding and graph classifier parts, which are trained using a graph embedding trainer 14A, and graph classifier trainer 16C, respectively. The graph embedding trainer 14A forms a neural network-based graph-to-vector model, with the aim of forming nearby vectors for graphs whose textual content and internal structures are similar to each other. The graph classifier trainer 14B forms a classifier model, which is able to rank pairs of graphs according to the similarity of their textual content and internal structure.

User data obtained from the user interface 18 is fed after embedding in the embedding unit 13 to the graph embedding engine for vectorization, after which a vector comparison engine 16B finds a set of closest vectors corresponding to the graphs of the graph store 10B. The set of closest graphs is fed to graph classifier engine 16C, which compares them one by one with the user graph, using the trained graph classifier model in order to get accurate matches.

In some embodiments, the graph embedding engine 16A, as trained by the graph embedding trainer 14A, outputs vectors whose angles are the closer to each other the more similar the graphs are in terms of both node content and nodal structure, as learned from the reference data using a learning target dependent thereof. Through training, the vector angles of positive training cases (graphs depicting the same concept) derived from the reference data can be minimized whereas the vector angles of negative training cases (graphs depicting different concepts), are maximized, or at least significantly deviating from zero.

The graph vectors may be chosen to have e.g. 200-1000 dimensions, such as 250-600 dimensions.

This kind of a supervised machine learning model has been found to be able to efficiently evaluate similarity of technical concepts disclosed by the graphs and further the blocks of natural language from which the graphs are derived.

In some embodiments, the graph classifier engine 16C, as trained by the graph classifier trainer 14C, outputs similarity scores, which are the higher the more similar the compared graphs are in terms of both node content and nodal structure, as learned from the reference data using a learning target dependent thereof. Through training, the similarity scores of positive training cases (graphs depicting the same concept) derived from the reference data can be maximized, whereas the similarity scores of negative training cases (graphs depicting different concepts), are maximized.

Cosine similarity is one possible criterion for similarity of graphs or vectors derived therefrom.

It should be noted that the graph classifier trainer 14C or engine 16C are not mandatory, but graph similarity can be evaluated directly based on the angles between of vectors embedded by the graph embedding engine. For this purpose, a fast vector index, which are known per se, can be used to find one or more nearby graph vectors for a given fresh graph vector.

The neural network used by the trainer 14 and search engine 16, or any or both sub-trainers 14A, 14C or sub-engines 16A, 16C thereof, can be a recurrent neural network, in particular one utilizing Long Short-Term Memory (LSTM) units. In case of tree-structured graphs, the network can be a Tree-LSTM network, such as a Child-Sum-Tree-LSTM network. The network may have one or more LSTM layers and one or more network layers. The network may use an attention mechanism that relates the parts of the graphs internally or externally to each other while training and/or running the model.

Some further embodiments of the invention are described in the following in the context of a patent search system, whereby the documents processed are patent documents. The general embodiments and principles described above are applicable to the patent search system.

In some embodiment, the system is configured to store in the storage means natural language documents each containing a first natural language block and a second natural language block different from the first natural language block. The trainer can use a plurality of first graphs corresponding to first blocks of first documents, and for each first graph one or more second graphs at least partially based on second blocks of second documents different from the first documents, as defined by the reference data. This way, the neural network model learns from inter-relations between different parts of different documents. On the other hand, the trainer can use a plurality of first graphs corresponding to first blocks of first documents, and for each first graph a second graph at least partially based on the second block of the first document. This way, the neural network model can learn from internal relations of data within a single document. Both these learning schemes can be used either alone or together by the patent search system described in detail next.

Condensed graph representations discussed above are particularly suitable for patent search systems, i.e. for claim and specification graphs, in particular for specification graphs.

Figure 1C:
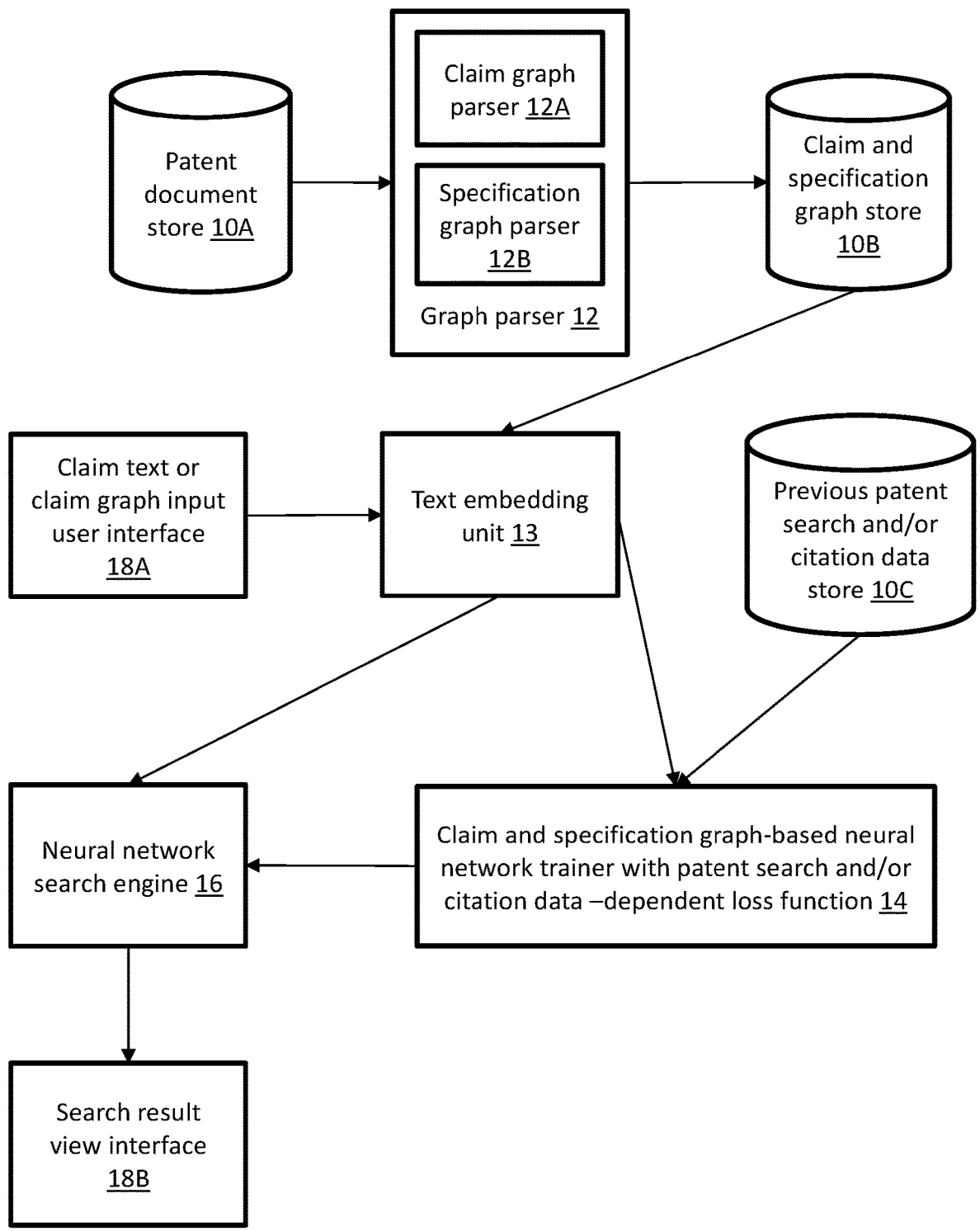
FIG. 1C shows a block diagram of a patent search system according to one embodiment.

FIG. 1C shows a system comprising a patent document store 10A containing patent documents containing at least a computer-identifiable description part and claim part. The graph parser 12 is configured to parse the claims by a claim graph parser 12A and the specifications by a specification graph parser 12B. The parsed graphs are separately stored to a claim and specification graph store 10B. The text embedding unit 13 prepares the graphs for processing in a neural network.

The reference data may contain search and/or examination data of public patent applications and patents and/or citation data between patent documents. In one embodiment, the reference data contains previous patent search results, i.e. information which earlier patent documents are regarded as novelty and/or inventive step bars for later-filed patent applications. The reference data is stored in the previous patent search and/or citation data store 10C.

The neural network trainer 14 uses the parsed and embedded graphs to form a neural network model trained particularly for patent search purposes. This is achieved by using the patent search and/or citation data as an input for the trainer 14. The aim is for example to minimize vector angle or maximize similarity score between claim graphs of a patent applications and specification graphs of patent documents used as novelty bars against thereof. This way, applied to a plurality (typically hundreds of thousands or millions) of claims, the model learns to evaluate the novelty of a claim with respect to prior art. The model is used by the search engine 16 for user graphs obtained through the user interface 18A to find the most potential novelty bars. The results can be shown in a search result view interface 18B.

The system of FIG. 10 can utilize a pipeline of search engines. The engines may be trained with the same or different subset of the training data obtained from the previous patent search and/or citation data store 100. For example, one can filter a set of graphs from a full prior art data set using a graph embedding engine trained with a large or full reference data set, i.e. positive and negative claim/specification pairs. The filtered set of graphs is then classified against the user graph in a classification engine, which may be trained with a smaller, for example, patent class specific reference data set, i.e. positive and negative claim/specification pairs, in order to find out the similarity of the graphs.

Next, a tree-form graph structure applicable in particular for a patent search system, is described with reference to FIGS. 2A and 2B.

Figure 2A:
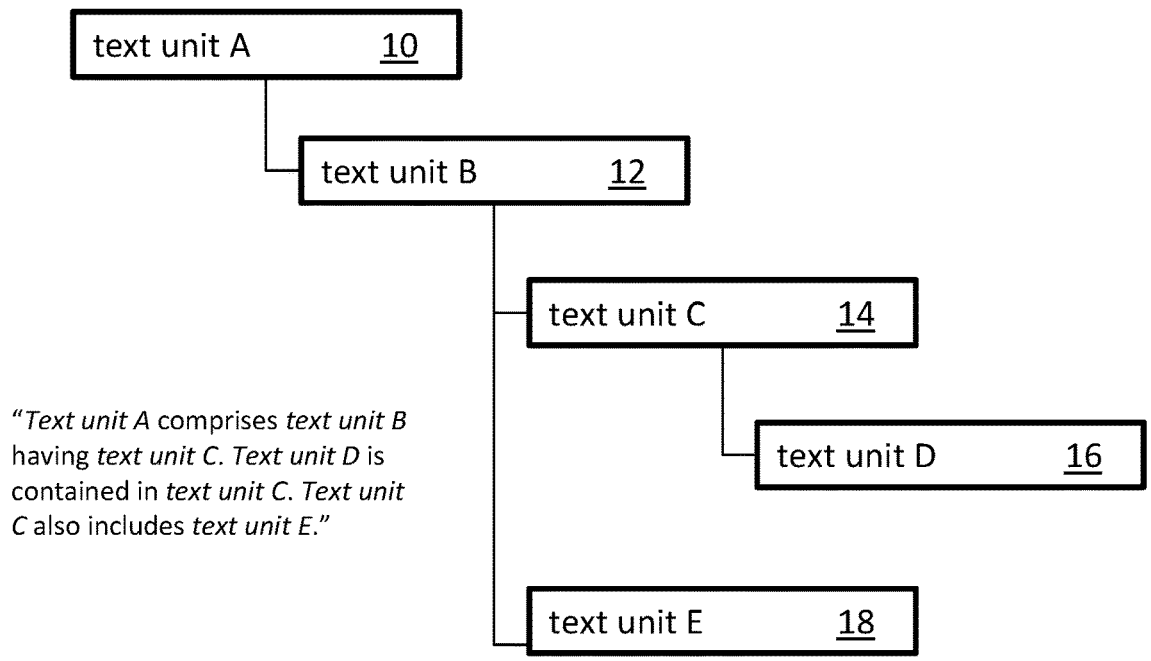
FIG. 2A shows a block diagram of an exemplary nested graph with only meronym/holonym relations.

FIG. 2A shows a tree-form graph with only meronym relations as edge relations. Text units A-D are arranged as linearly recursive nodes 10, 12, 14, 16 into the graph, stemming from the root node 10, and text unit E as a child of node 12, as a child node 18, as derived from the block of natural language shown. Herein, the meronym relations are detected from the meronym/holonym expressions "comprises", "having", "is contained in" and "includes".

Figure 2B:
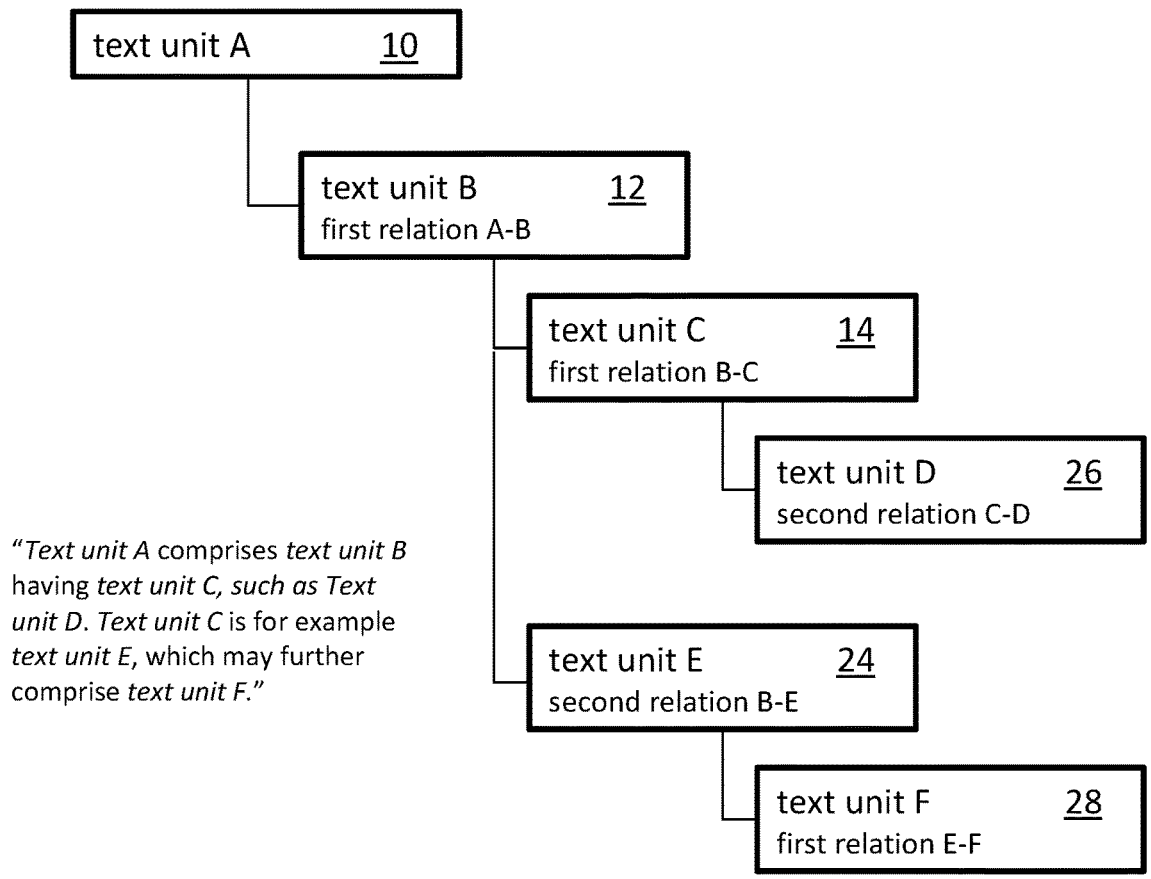
FIG. 2B shows a block diagram of an exemplary nested graph with meronym/holonym relations and hyponym/hypernym relations.

FIG. 2B shows another tree-form graph with two different edge relations, in this example meronym relations (first relation) and hyponym relations (second relation). Text units A-C are arranged as linearly recursive nodes 10, 12, 14 with meronym relation. Text unit D is arranged as a child node 26 of parent node 14 with hyponym relation. Text unit E is arranged as a child node 24 of parent node 12 with hyponym relation. Text unit F is arranged as a child node 28 of node 24 with meronym relation. Herein, the meronym and hyponym relations are detected from the meronym/holonym expressions "comprises", "having", "such as" and "is for example".

According to one embodiment, the first data processing means is adapted to convert the blocks to graphs by first identifying from the blocks a first set of natural language tokens (e.g. nouns and noun chunks) and a second set of natural language tokens (e.g. meronym and holonym expressions) different from the first set of natural language tokens. Then, a matcher is executed utilizing the first set of tokens and the second set of tokens for forming matched pairs of first set tokens (e.g. "body" and "member" from "body comprises member"). Finally, the first set of tokens is arranged as nodes of said graphs utilizing said matched pairs (e.g. "body"—(meronym edge)—"member").

In one embodiment, at least meronym edges are used in the graphs, whereby the respective nodes contain natural language units having a meronym relation with respect to each other, as derived from said blocks.

In one embodiment, hyponym edges are used in the graph, whereby the respective nodes contain natural language units having a hyponym relation with respect to each other, as derived from the blocks of natural language.

In one embodiment, edges are used in the graph, at least one of the respective nodes of which contain a reference to one or more nodes in the same graph and additionally at least one natural language unit derived from the respective block of natural language (e.g. "is below" [node id: X]). This way, graph space is saved and simple, e.g. tree-form, graph structure can be maintained, still allowing expressive data content in the graphs.

In some embodiments, the graphs are tree-form graphs, whose node values contain words or multi-word chunks derived from said blocks of natural language, typically utilizing parts-of-speech and syntactic dependencies of the words by the graph converting unit, or vectorized forms thereof.

Figure 3:
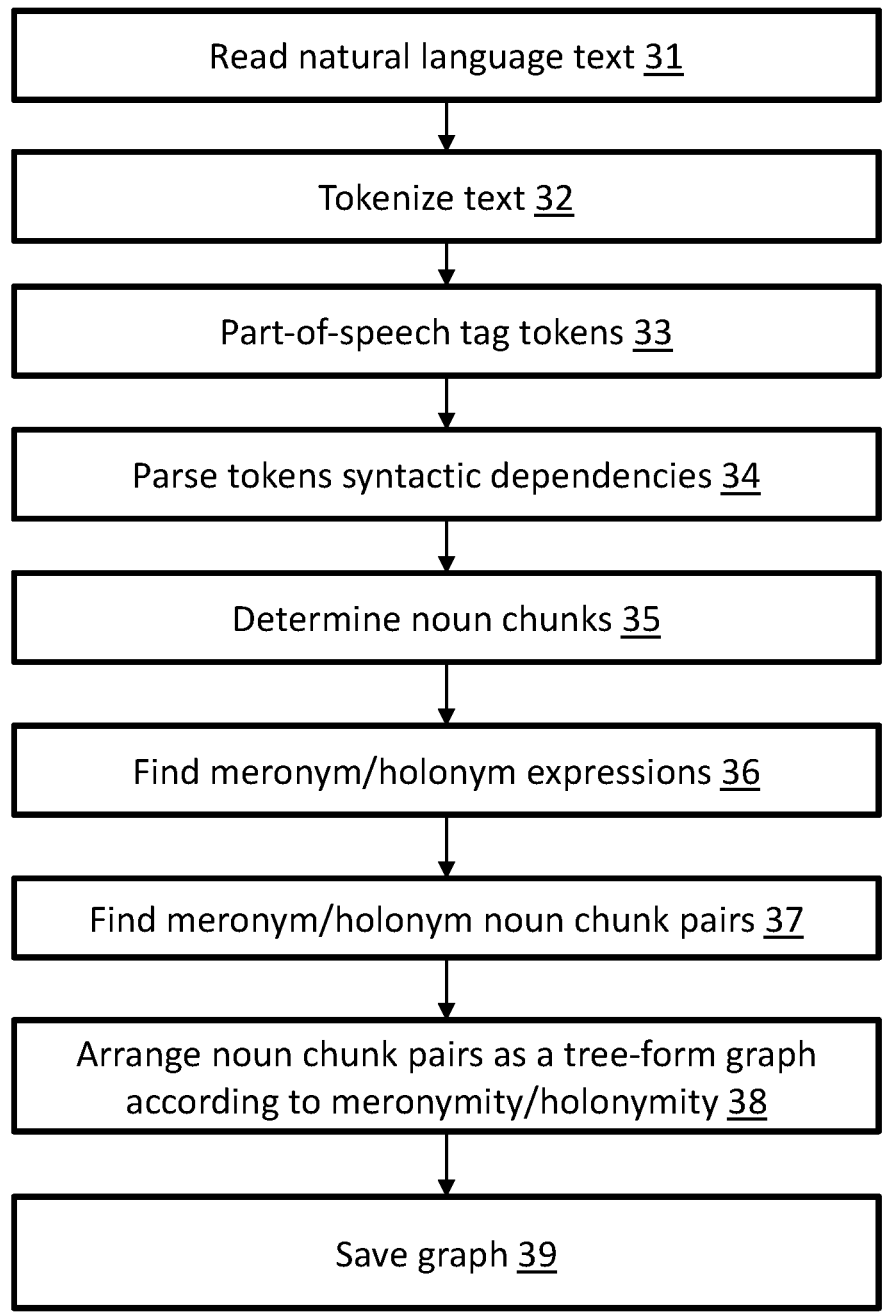
FIG. 3 shows a flow chart of an exemplary graph parsing algorithm.

FIG. 3 shows in detail an example of how the text-to-graph conversion can be carried out in the first data processing means. First, the text is read in step 31 and a first set of natural language tokens, such as nouns, and a second set of natural language tokens, such as tokens indicating meronymity or holonymity (like "comprising"), are detected from the text. This can be carried out by tokenizing the text in step 32, part-of-speech (POS) tagging the tokens 33, deriving their syntactic dependencies in step 34. Using that data, the noun chunks can be determined in step 35 and the meronym and holonym expressions in step 36. In step 37, matched pairs of noun chunks are formed utilizing the meronym and holonym expressions. The noun chunk pairs form or can be used to deduct meronym relation edges of a graph.

In one embodiment, as shown in step 38, the noun chunk pairs are arranged as a tree-form graphs, in which the meronyms are children of corresponding holonyms. The graphs can be saved in step 39 in the graph store for further use, as discussed above.

In one embodiment, the graph-forming step involves the use of a probabilistic graphical model (PGM), such as a Bayesian network, for inferring a preferred graph structure. For example, different edge probabilities of the graph can be computed according to a Bayesian model, after which the likeliest graph form is computed using the edge probabilities.

In one embodiment, the graph-forming step comprises feeding the text, typically in tokenized, POS tagged and dependency parsed form, into a neural network based technical parser, which finds relevant chunks from the block of text and extracts their desired edge relations, such as meronym relations and/or hyponym relations.

In one embodiment, the graph is a tree-form graph comprising edge relations arranged recursively according to a tree data schema, being acyclic. This allows for efficient tree-based neural network models of the recurrent or non-recurrent type to be used. An example is the Tree-LSTM model.

In another embodiment, the graph is a network graph allowing cycles, i.e. edges between branches. This has the benefit of allowing complex edge relations to be expressed.

In still another embodiment, the graph is a forest of linear and/or non-linear branches with a length of one or more edges. Linear branches have the benefit that the tree or network building step is avoided or dramatically simplified and maximum amount of source data is available for the neural network.

In each model, edge likelihoods, if obtained through a PGM model, can be stored and used by the neural network.

It should be noted that the graph-forming method as described above with reference to FIG. 3 and elsewhere in this document, can be carried out independently of the other method and system parts described herein, in order to form and store technical condensed representations of technical contents of documents, in particular patent specifications and claims.

Figure 4A:
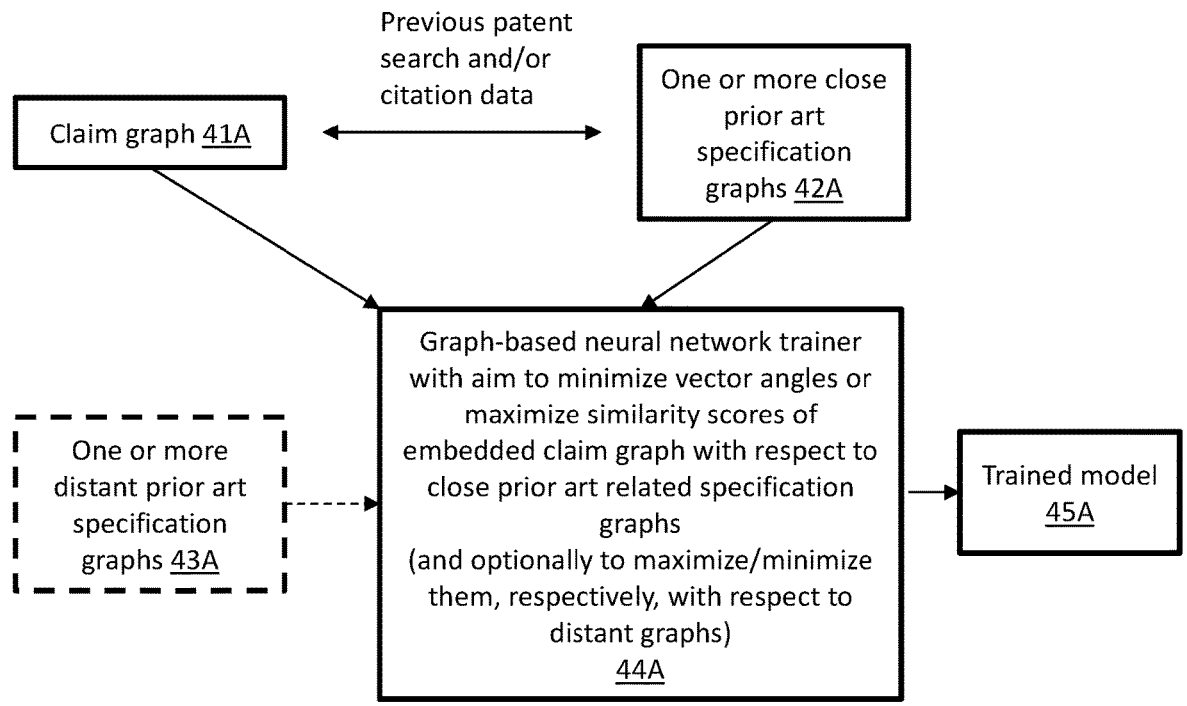
FIG. 4A shows a block diagram of patent search neural network training using patent search/citation data as training data.
Figure 4B:
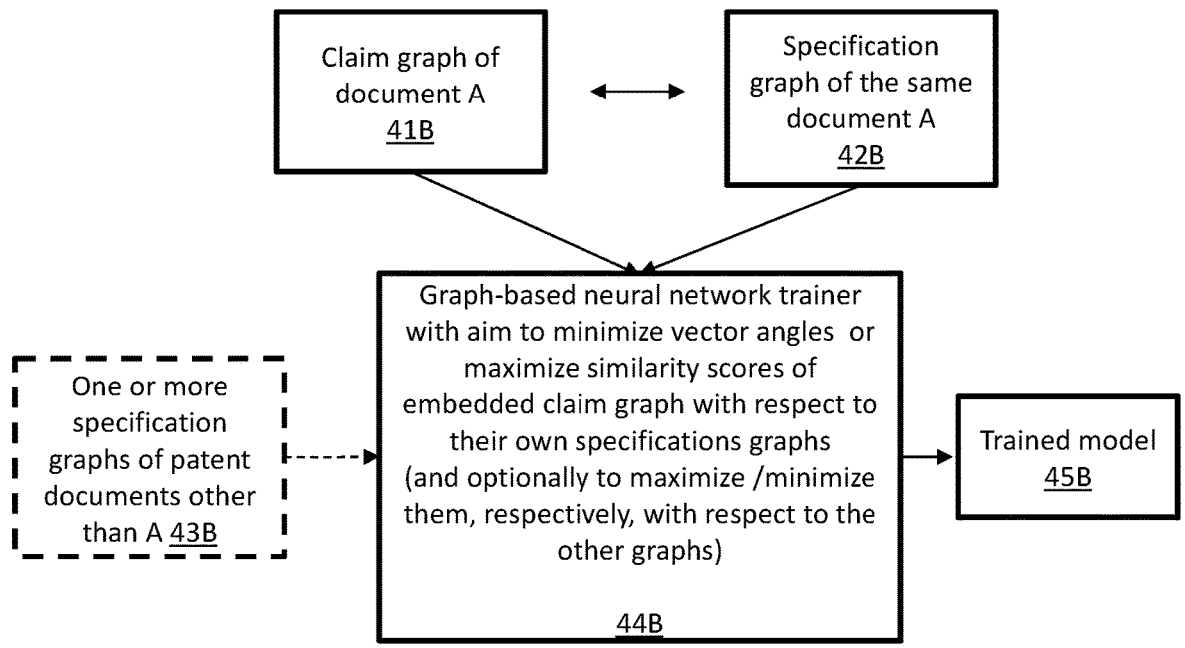
FIG. 4B shows a block diagram of neural network training using claim-description graph pairs originating from the same patent document as training data.
Figure 4C:
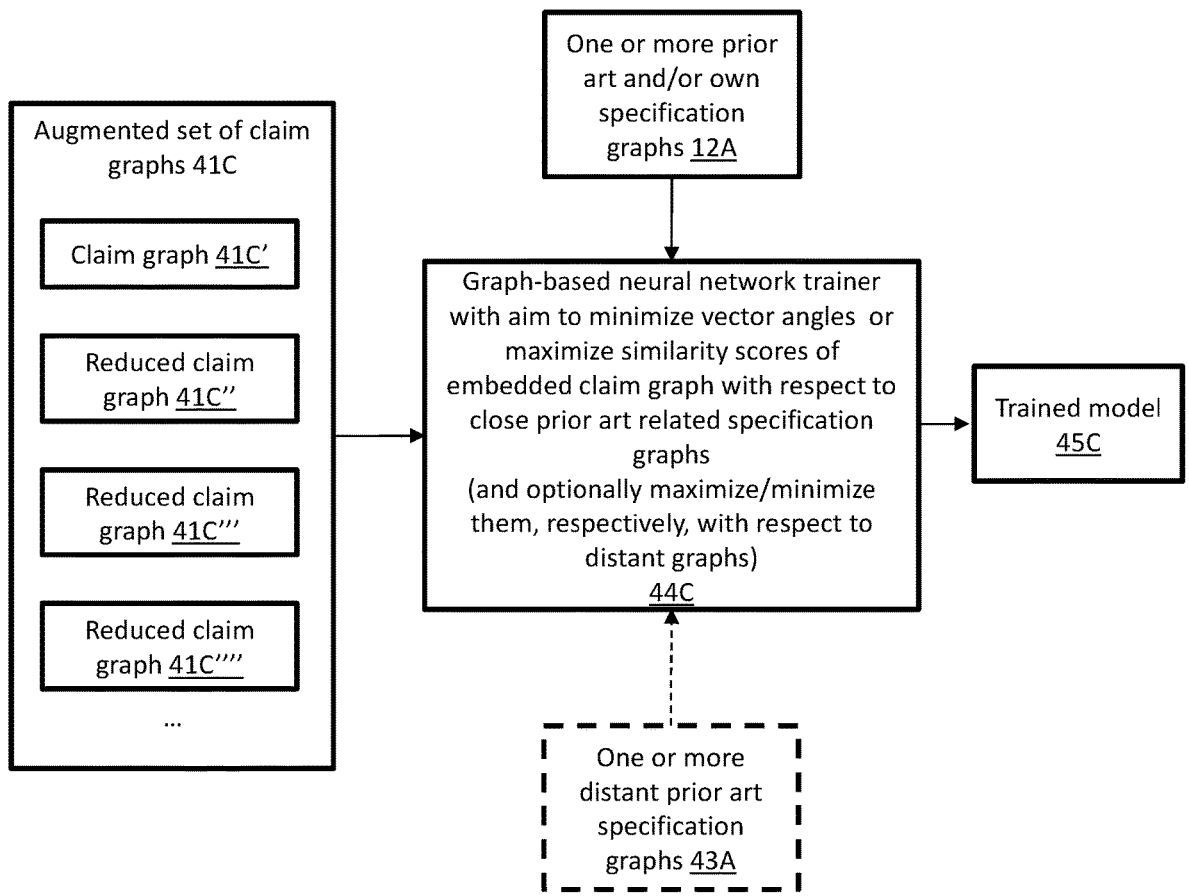
FIG. 4C shows a block diagram of neural network training using an augmented claim graph set as training data.

FIGS. 4A-C show different, but mutually non-exclusive, ways of training the neural network in particular for patent search purposes.

For a generic case, the term "patent document" can be replaced with "document" (with unique computer-readable identifier among other documents in the system). "Claim" can be replaced with "first computer-identifiable block" and "specification" with "second computer-identifiable block at least partially different from the first block".

In the embodiment of FIG. 4A, a plurality of claim graphs 41A and corresponding close prior art specification graphs 42A for each claim graph, as related by the reference data, are used by the neural network trainer 44A as the training data. These form positive training cases, indicating that low vector angle or high similarity score between such graphs is to be achieved. In addition, negative training cases, i.e. one or more distant prior art graphs, for each claim graph, can be used as part of the training data. A high vector angle or low similarity score between such graphs is to be achieved. The negative training cases can be e.g. randomized from the full set of graphs.

According to one embodiment, in at least one phase of the training, as carried out by the neural network trainer 44A, a plurality of negative training cases are selected from a subset of all possible training cases which are harder than the average of all possible negative training cases. For example, the hard negative training cases can be selected such that both the claim graph and the description graph are from the same patent class (up to a predetermined classification level) or such that the neural network has previously been unable to correctly classify the description graph as a negative case (with predetermined confidence).

According to one embodiment, which can also be implemented independently of the other method and system parts described herein, training of the present neural network-based patent search or novelty evaluation system is carried out by providing a plurality of patent documents each having a computer-identifiable claim block and specification block, the specification block including at least part of the description of the patent document. The method also comprises providing a neural network model and training the neural network model using a training data set comprising data from said patent documents for forming a trained neural network model. The training comprises using pairs of claim blocks and specification blocks originating from the same patent document as training cases of said training data set.

Typically, these intra-document positive training cases form a fraction, such as 1-25% of all training cases of the training, the rest containing e.g. search report (examiner novelty citation) training cases.

The present machine learning model is typically configured to convert claims and specifications into vectors and a learning target of training of the model can be to minimize vector angles between claim and specification vectors of the same patent document. Another learning target can be to maximize vector angles between claim and specification vectors of at least some different patent documents.

In the embodiment of FIG. 4B, a plurality of claim graphs 41A and specification graphs 42A originating from the same patent document, are used by the neural network trainer 44B as the training data. An "own" specification of a claim typically forms a perfect positive training case. That is, a patent document itself is technically an ideal novelty bar for its claim. Therefore, these graph pairs form positive training cases, indicating that low vector angle or high similarity score between such graphs is to be achieved. In this scenario too, reference data and/or negative training cases can be used.

Tests have shown that simply by adding claim-description pairs from the same document to real-life novelty search based training data has increased prior art classification accuracy by more than 15%, when tested with real-life novelty search-based test data pairs.

In a typical case, at least 80%, usually at least 90%, in many cases 100%, of machine-readable content (natural language units, in particular words) of a claim are found somewhere in the specification of the same patent document. Thus, claims and specifications of patent documents are linked to each other not only via cognitive content and the same unique identifier (e.g. publication number), but also their byte-level content.

According to one embodiment, which can also be implemented independently of the other method and system parts described herein, training of the present neural network based patent search or novelty evaluation engine comprises deriving from at least some original claim or specification blocks at least one reduced data instance partially corresponding to the original block, and using said reduced data instances together with said original claim or specification blocks as training cases of said training data set.

In the embodiment of FIG. 4C, the positive training cases are augmented by forming from an original claim graph 41C' a plurality of reduced claim graphs 41C"-41C"". A reduced claim graph means a graph where

- at least one node is removed (e.g. phone-display-sensor-→phone-display)
- at least one node moved to another position at a higher (more general) position of the branch (e.g. phone-display-sensor→phone-(display, sensor), and/or
- the natural language unit value of at least one node is replaced with a more generic natural language unit value (phone-display-sensor→electronic device-display-sensor).

This kind of augmenting scheme allows the training set for the neural network to be expanded, resulting in a more accurate model. It also allows making of meaningful searches for and to evaluate the novelty of so called trivial inventions, with only few nodes, or with very generic terms, which are not seen at least much in the real patent novelty search data. Data augmentation can be carried out in connection with either of the embodiments of FIGS. 4A and 4B or their combination. In this scenario too, negative training cases can be used.

Negative training cases can also be augmented too, by removing, moving or replacing nodes or their values in the specification graph.

A tree-form graph structure, such as a meronym relation based graph structure is beneficial for the augmentation scheme, since augmenting is possible by deleting or moving nodes to higher tree position in a straightforward and robust manner, still preserving coherent logic. In this case, both the original and reduced data instances are graphs.

In one embodiment, a reduced graph is a graph where at least one leaf node has been deleted with respect to the original graph or another reduced graph. In one embodiment, all leaf nodes at a certain depth of the graph are deleted.

Augmentation of the present kind can be carried out also directly for block of natural language in particular by deleting parts thereof or partially changing their contents to more generic content.

The number of reduced data instances per original instance can be e.g. 1-10 000, in particular 1-100. Good training results are achieved in claim augmentation with 2-50 augmented graphs.

In some embodiments, the search engine reads a fresh block of natural language, such as a fresh claim, which is converted to a fresh graph by the converter, or directly a fresh graph through a user interface. A user interface suitable for direct graph input is discussed next.

Figure 5:
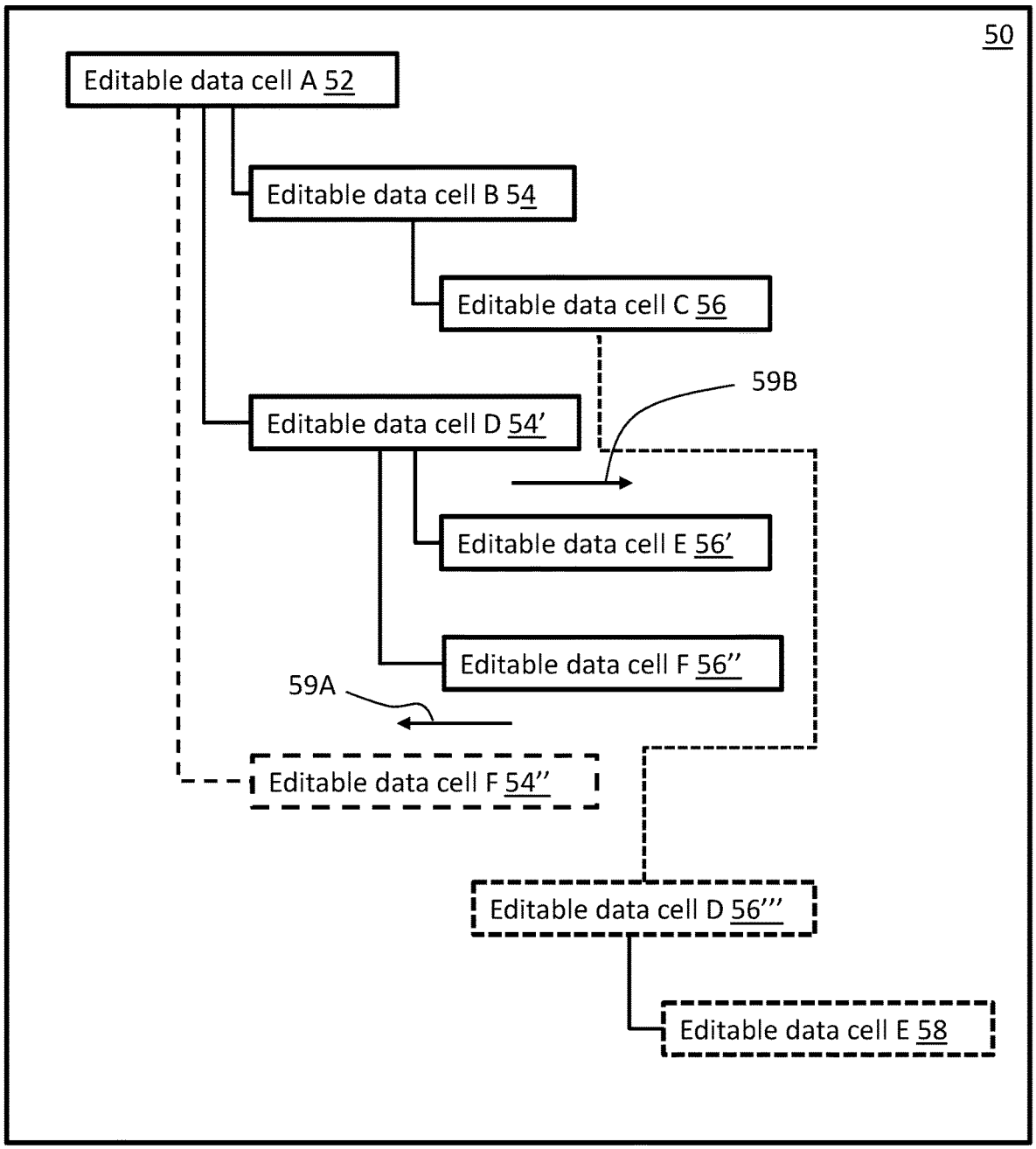
FIG. 5 illustrates the functionalities of an exemplary graph feeding user interface according to one embodiment.

FIG. 5 illustrates the representation and modification of an exemplary graph on a display element 50 of a user interface. The display element 50 comprises a plurality of editable data cells A-F, whose values are functionally connected to corresponding natural language units (say, units A-F, correspondingly) of an underlying graph and are shown in respective user interface (UI) data elements 52, 54, 56, 54', 56', 56". The UI data elements may be e.g. text fields whose value is editable by keyboard after activating the element. The UI data elements 52, 54, 65, 54' 56' 56" are positioned on the display element 50 horizontally and vertically according to their position in the graph. Herein, horizontal position corresponds to the depth of the unit in the graph.

The display element 50 can be e.g. a window, frame or panel of a web browser running a web application, or a graphical user interface window of a standalone program executable in a computer.

The user interface comprises also a shifting engine which allows for moving the natural language units horizontally (vertically) on the display element in response to user input, and to modify the graph accordingly. To illustrate this, FIG. 5 shows the shifting of data cell F (element 56") left by one level (arrow 59A). Due to this, the original element 56" nested under element 54' ceases to exist, and the element 54" nested under higher-level element 52 and comprising the data cell F (with its original value) is formed. If thereafter data element 54' is shifted right by two levels (arrow 59B), data elements 54' and its child are shifted right and nested under data element 56 as data element 56''' and data element 58. Each shift is reflected by corresponding shift of nesting level in the underlying graph.

Thus, children of units are preserved in the graph when they are shifted in the user interface to a different nesting level.

In some embodiments, the UI data elements comprise natural language helper elements, which are shown in connection with the editable data cells for assisting the user to enter natural language data. The content of the helper elements can be formed using the relation unit associated with the natural language unit concerned and, optionally, the natural language unit of its parent element.

Instead of a graph-based user interface like illustrated in FIG. 5, the user interface may allow input of a block text, such as an independent claim. The block of text is then fed to the graph parser in order to obtain a graph usable in further stages of the search system.

The invention claimed is:

1. A computer-implemented method of training a machine learning based patent search or novelty evaluation system, comprising:
   providing a plurality of patent documents each having a computer-identifiable claim block and computer-identifiable specification block, the specification block including at least part of the description of the patent document,
   converting the claim blocks and specification blocks into graphs containing a plurality of nodes each containing a natural language unit extracted from respective blocks,
   providing a machine learning model which is a graph-based neural network model capable of embedding the graphs into vectors, and
   training the machine learning model using a training data set comprising data from said patent documents for forming a trained machine learning model,
   wherein
   said training comprises using pairs of claim blocks and specification blocks originating from the same patent document as training cases of said training data set, and using claim graphs and specification graphs originating from the same patent document as said training cases, the learning target of the training being to minimize vector angles between the claim graphs and specification graphs.

2. The method according to claim 1, further comprising using said pairs of claim blocks and specification blocks originating from the same patent document as positive training cases, indicative of a positive search hit or negative novelty evaluation result.

3. The method according to claim 1, wherein the graph format is a recursive tree format comprising nested nodes having natural language data units as node values.

4. The method according to claim 1, wherein said converting comprises:
   identifying from said blocks a first set of natural language tokens and a second set of natural language tokens different from the first set of natural language tokens,
   executing a matcher utilizing said first set of tokens and said second set of tokens for forming matched pairs of first set tokens, and
   arranging at least part of said first set of tokens as successive nodes of said graphs utilizing said matched pairs.

5. The method according to claim 1, wherein said graphs contain a plurality of edges, the respective nodes of which contain natural language units having a meronym or hyponym relation with respect to each other, as derived from the blocks of natural language.

6. The method according to claim 1, further using second pairs of claim blocks and specification blocks originating from different patent documents as training cases of said training data set.

7. The method according to claim 1, wherein the claim block consists of an independent claim of the patent document.

8. The method according to claim 1, wherein the claim block consists of a combination of an independent claim and a dependent claim thereof, of the patent document.

9. A machine learning based natural language document comparison system, comprising:
   a machine learning training sub-system adapted to:
      read first blocks and second blocks of documents and to utilize said blocks as training data for forming a trained machine learning model, wherein the second blocks are at least partially different from the first blocks,
      convert the first blocks and second blocks into a first and second graphs containing a plurality of nodes each containing a natural language unit extracted from respective blocks, and
      use a graph based neural network algorithm and to utilize first graphs and second graphs originating from the same document as training cases of said training data set; and
   a machine learning search engine using the trained machine learning model for finding a subset of documents among a larger set of documents,
   wherein the machine learning training sub-system is configured to use pairs of first blocks and second blocks originating from the same document as training cases of said training data.

10. The system according to claim 9, wherein said graphs contain a plurality of edges, the respective nodes of which contain natural language units having a meronym or hyponym relation with respect to each other, as derived from the blocks of natural language.

11. The system according to claim 9, further using second pairs of first blocks and second blocks originating from different documents as training cases of said training data set.

12. The system according to claim 9, wherein the machine learning training sub-system is adapted to read patent documents as said documents, whereby the first blocks are claim blocks and the second blocks are specification blocks of the patent documents.

13. The system according to claim 9, wherein a learning target of training of the model is to minimize vector angles between claim and specification vectors of the same patent document.

14. The system according to claim 9, wherein a further learning target of training of the model is to maximize vector angles between claim and specification vectors of different patent documents.

15. The method according to claim 7, wherein the independent claim is the first independent claim of the patent document.

16. The method according to claim 1, wherein the converting is done by a graph parser, and wherein the training is done by a neural network training unit.

17. A computer-implemented method of training a machine learning based patent search or novelty evaluation system, comprising:

provicing a plurality of patent documents each having a computer-identifiable claim block and computer-identifiable specification block, the specification block including at least part of the description of the patent document, converting the claim blocks and specification blocks into graphs containing a plurality of nodes each containing a natural language unit extracted from respective blocks, providing a machine learning model which is a graph-based neural network model capable of embedding the graphs into vectors, and training the machine learning model using a training data set comprising data from said patent documents for forming a trained machine learning model, wherein said training comprises using pairs of claim blocks and specification blocks originating from different patent documents as training cases of said training data set, and using claim graphs and specification graphs originating from said different patent documents as negative training cases, the learning target of the training being to maximize vector angles or to provide non-zero vector angles between the claim graphs and specification graphs.

* * * * *